US012348358B2

United States Patent
Mulam et al.

(10) Patent No.: US 12,348,358 B2
(45) Date of Patent: Jul. 1, 2025

(54) METHOD AND APPARATUS FOR IMPLEMENTATION AND USE OF HIGH AVAILABILITY CLUSTERS

(71) Applicant: Celona, Inc., Campbell, CA (US)

(72) Inventors: Ravi Mulam, Campbell, CA (US); Keshav Sai Srinivas Nanduri, Campbell, CA (US); Hao Sun, Campbell, CA (US); Vinay Anneboina, San Jose, CA (US)

(73) Assignee: CELONA, INC., Campbell, CA (US)

( * ) Notice: Subject to any disclaimer, the term of this patent is extended or adjusted under 35 U.S.C. 154(b) by 0 days.

(21) Appl. No.: 18/080,928

(22) Filed: Dec. 14, 2022

(65) Prior Publication Data

US 2023/0198830 A1  Jun. 22, 2023

Related U.S. Application Data

(60) Provisional application No. 63/289,544, filed on Dec. 14, 2021.

(51) Int. Cl.
*H04L 41/0663* (2022.01)
*H04L 45/586* (2022.01)

(52) U.S. Cl.
CPC ........ *H04L 41/0663* (2013.01); *H04L 45/586* (2013.01)

(58) Field of Classification Search
CPC ............. H04L 41/0663; H04L 41/0668; H04L 41/0893; H04L 41/12; H04L 45/28; H04L 45/586; H04L 45/22; H04L 12/66; H04L 43/0805; H04L 61/2503; H04L 67/025; G06F 11/1448; G06F 11/2094; G06F 9/45558

See application file for complete search history.

(56) References Cited

U.S. PATENT DOCUMENTS

| | | | |
|---|---|---|---|
| 7,856,480 B2 * | 12/2010 | Muchow | H04L 67/025 709/224 |
| 10,567,252 B1 * | 2/2020 | Mukhopadhyaya | H04L 43/0805 |
| 10,715,411 B1 | 7/2020 | Jacob Da Silva et al. | |
| 2009/0016215 A1 * | 1/2009 | Nadas | H04L 45/586 370/230 |
| 2010/0325257 A1 | 12/2010 | Goel et al. | |
| 2014/0204760 A1 | 7/2014 | Durrani et al. | |
| 2020/0045087 A1 * | 2/2020 | Srinath | H04L 12/66 |

(Continued)

OTHER PUBLICATIONS

Matos, Taina, International Search Report and Written Opinion received from the USRO dated Mar. 10, 2023 for appln. No. PCT/US2922/052796, 6 pgs.

*Primary Examiner* — Le H Luu
(74) *Attorney, Agent, or Firm* — Jaquez Land Greenhaus & McFarland, LLP; Bruce W. Greenhaus

(57) ABSTRACT

A private network is disclosed as having an HA (high availability) cluster and a VRRP (Virtual Router Redundancy Protocol) router for each of several nodes within the HA cluster. The VRPP router tracks each worker node in the cluster and provides a reliable service that run on the cluster of nodes. Track worker nodes are closely tracked using the VRRP router for each node. Node failures are immediately acted upon. In addition, a load balancer layer allows the amount of resources being used at any particular time to be balanced between the different nodes in the cluster.

7 Claims, 2 Drawing Sheets

(56) References Cited

U.S. PATENT DOCUMENTS

| | | | |
|---|---|---|---|
| 2020/0177503 A1* | 6/2020 | Hooda | H04L 12/66 |
| 2021/0067403 A1 | 3/2021 | Srinivasa et al. | |
| 2021/0103507 A1* | 4/2021 | Pfister | H04L 61/2503 |
| 2021/0389883 A1* | 12/2021 | Derryberry | G06F 11/2094 |
| 2021/0399920 A1* | 12/2021 | Sundararajan | H04L 41/12 |
| 2022/0060408 A1* | 2/2022 | Manickam | H04L 45/22 |
| 2022/0374519 A1* | 11/2022 | Botelho | G06F 9/45558 |
| 2023/0146076 A1* | 5/2023 | Gupta | G06F 11/1448 707/640 |

* cited by examiner

METHOD AND APPARATUS FOR IMPLEMENTATION AND USE OF HIGH AVAILABILITY CLUSTERS

CLAIM OF PRIORITY TO PREVIOUSLY FILED PROVISIONAL APPLICATION-INCORPORATION BY REFERENCE

This non-provisional application claims priority to an earlier-filed provisional application No. 63/289,544 filed Dec. 14, 2021, entitled "Method and Apparatus for Implementation and Use of High Availability Clusters" and the provisional application No. 63/289,544 filed Dec. 14, 2021, and all its contents, are hereby incorporated by reference herein as if set forth in full.

BACKGROUND

(1) Technical Field

The disclosed method and apparatus relate generally to multi-processor systems. In particular, the disclosed method and apparatus relates to a method and apparatus for efficiently providing access to high availability clusters and performing load balancing among components thereof.

Containerized applications are applications that run in isolated runtime environments called "containers". That is, the application can be run without the need for any additional resources and formatting. Containers encapsulate an application with all its dependencies, including system libraries, binaries, and configuration files. By packaging all of the required components of the containerized application together, the application can run consistently across different hosts. This allows an application to be designed to run on a very wide variety of hosts (i.e., processors tasked with executing the code that performs the service for which the application was designed to provide). Notably, however, and unlike virtual machines, containers do not include their own operating systems. Rather, different containerized applications that are each running on a host system, share the operating system provided by the host. Containers are extremely lightweight and can launch fast, since they do not need to bundle an extra operating system with the application. When the developer wishes to scale an application, more instances (e.g., copies) of a container can be added almost instantaneously.

Developers typically use containers to solve two main challenges with application hosting. The first challenge is that engineers often struggle to make applications run consistently across different hosting environments. Even when the base OS of host systems is the same, slight differences among those systems in hardware or software can lead to unexpected differences in behavior, causing, for example, issues to appear in production that were not apparent during staging or development. Containerizing an application avoids this problem by providing a consistent and standardized environment for that application to run in.

The second challenge is that, although any hosted application needs to be isolated from all others to run securely and reliably, achieving this isolation with physical servers requires a significant amount of resources. Though VMs (Virtual Machines) are relatively lightweight and can provide the required isolation, using a VM to isolate an application nonetheless requires considerable RAM, storage, and compute resources. Containerization protects applications more efficiently than using VMs by using OS-native features, such as Linux, to isolate each container from other processes that running on the same host.

Microservices, which in some cases use containerized applications, refers to an architectural design that is based on a series of individual modules, or services that taken together provide a service. This contrasts with monolithic applications in which the entire application being written as a single block of code that provides the service.

Monolithic applications tend to grow in size and scope over time. This, together with the fact that the services are tightly coupled leads to slower, more challenging deployments of the overall service. Furthermore, monolithic architectures can have a high risk of failure due to their complexity. This complexity can increase every time a new feature is deployed.

Microservice applications are designed by breaking a monolithic application into independent modules, each of which contain one or more discrete components of a single service (e.g., a business function to be performed). In cases in which each microservice is running on Kubernetes, the microservices expect their peer's microservices to be reachable over a network, when necessary.

Accordingly, there is a need for microservices that can provide communication network functions and the need for reliability from such functions, and a need for an efficient system that requires the least amount of resources to perform these functions.

SUMMARY

In some embodiments of the disclosed method and apparatus, a private network has an HA (high availability) cluster and a VRRP (Virtual Router Redundancy Protocol) router for each of several nodes within the HA cluster. The VRPP router tracks a plurality of worker nodes, each residing within an edge node of the cluster. Functions or services are provided by the HA cluster, which are serviced by containerized applications running as microservices running on Kubernetes. The use of an architecture that uses microservices and containerized applications provides a reliable service that runs on the cluster of nodes. Having a number of edge nodes, each of which can host the one active leader operating within the HA cluster. In addition, each edge node has a worker node. Worker nodes are closely tracked using the VRRP router for each node. Node failures are immediately acted upon by reassigning the IP address of the failed node to one of the other functioning nodes. In addition, a load balancer layer allows the amount of resources being used at any particular time to be balanced between the different nodes in the cluster

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

Figure 1:
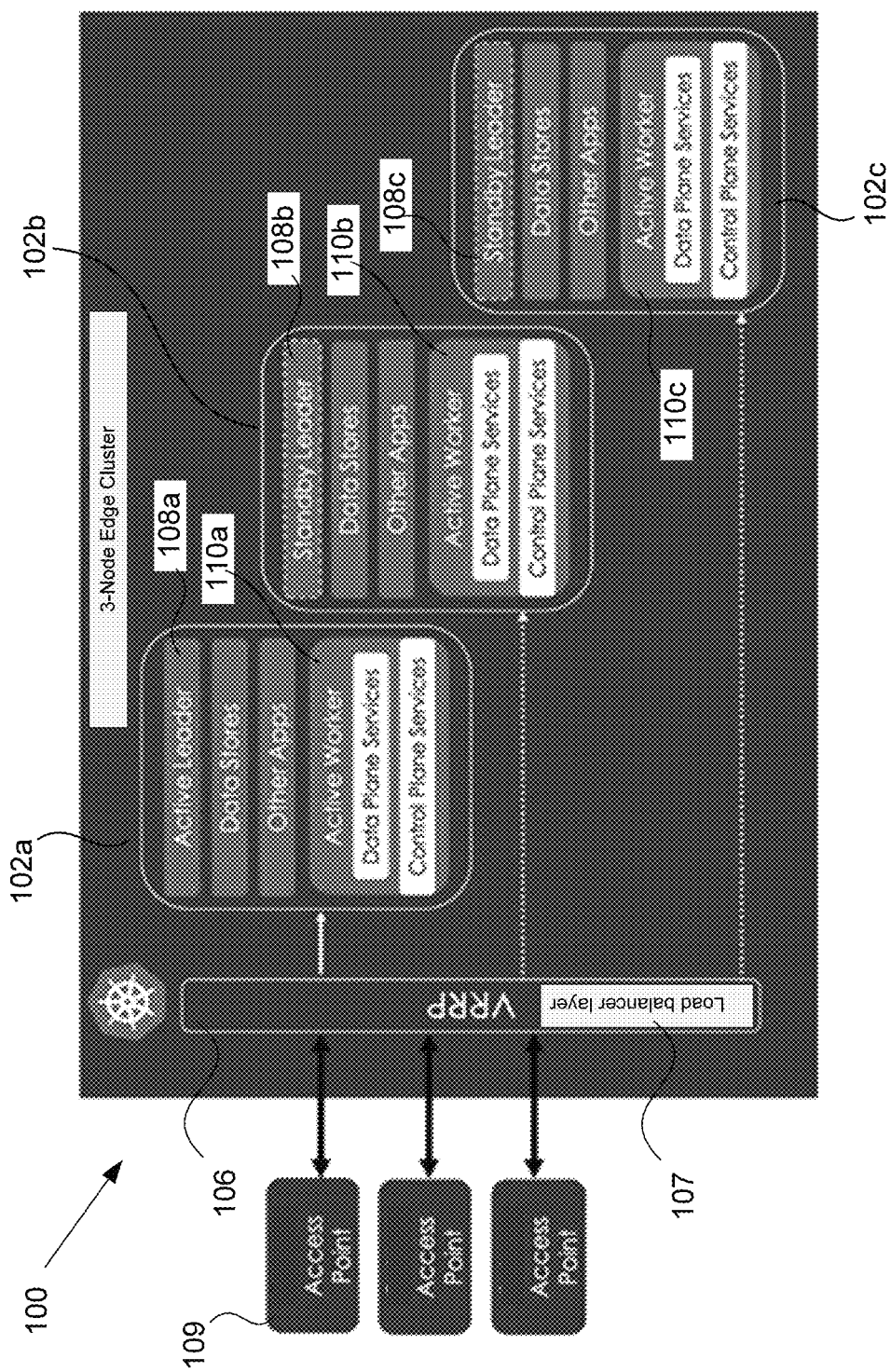
FIG. 1 is an illustration of the architecture 100 of a three-node edge cluster.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

A combination of multiple containerized applications, operating as microservices running on Kubernetes, is disclosed. Kubernetes is an open-source system for automating deployment, scaling, and management of containerized applications.

When using an architecture operating microservices running on Kubernetes to provide containerized applications to make a private LTE/5G network highly available, multiple nodes (i.e., virtual machines/physical machines or servers) are needed to host components of the network stack. Kubernetes provides a mechanism to form HA (High Availability) clusters using multiple nodes. An HA cluster is a group of hosts that act like a single system and provide continuous uptime. HA clusters are often used for load balancing, backup and failover purposes. To properly configure a HA cluster, the hosts in the cluster must all have access to the same shared storage. Providing HA clusters allows load balancing of in-coming traffic across the various nodes of the HA cluster by providing a load balancer layer. In addition, multiple copies of a microservice can be launched within multiple nodes by scheduling containers across some or all of the nodes of a Kubernetes cluster. Should a node failure occur, Kubernetes automatically reschedules the workload from the failed node onto the remaining nodes, but with some restrictions.

Although Kubernetes provides a mechanism to form an HA cluster, it has limitations that need to be addressed before it can support critical applications, such as a private LTE/5G network. Some of these limitations include the following.

Quick Removal of Unresponsive Stateful Microservices

If a node running a stateful one or more microservices fails, Kubernetes does not automatically remove unresponsive processes (pods) of the stateful application from the cluster. Kubernetes expects the node object to be deleted from the cluster or for a user to force delete the pods (see https://kubernetes.io/docs/tasks/run-application/force-delete-stateful-set-pod/#delete-pods).

This is not a desirable behavior. Rather, stateful services that are part of the private enterprise network stack (such as a service that holds the Home Subscriber Service database) should be removed from the cluster so that stale endpoints are no longer accessed.

Quick Removal of Unresponsive Endpoints From Load Balancers on a Node Failure Event Kubernetes service object allows applications to be fronted by a load balancer layer that routes traffic in a round-robin manner to all the instances of an application. In case of a node failure event, until an instance (pod) of an application is removed, Kubernetes continues to route traffic to unresponsive endpoints until an API (Application Specific Interface (such as node delete or pod delete) is invoked to remove the stale endpoint.

Rather than operating in this way, it would be desirable to ensure only active/valid endpoints are considered for routing traffic. For example, if a MME (Mobility Management Entity) pod fails, it is desirable to ensure that no S1 requests from access points (AP) reach the stale MME pods and timeout. In a CBRS network, the APs are CBSDs (Citizen Band Service Devices). Failing to do so causes a ripple effect and results in network downtime.

Quick Failover (Re-Scheduling) of Pods Away From Failed Nodes and Onto Remaining Active Nodes While Kubernetes has the ability to reschedule pods from one failed node onto the remaining available nodes, it does so with significant delays and only when a user (manual/automated) explicitly deletes failed nodes from the Kubernetes cluster. When a node fails, it simply transitions to NotReady state and waits. Only when a node is removed will Kubernetes reschedule the pods onto the remaining nodes.

In case of a node failure event, it would be desirable for datapath pods to failover quickly onto remaining nodes and start accepting incoming traffic ASAP. It is also desirable for this time to be as small as possible to avoid network disruptions.

Kubernetes API Server Momentarily Unresponsive When Nodes are Added to Cluster

When nodes are added to an existing cluster, Kubernetes components like API server, etc. temporarily timeout APIs when a new node is added. This causes disruptions in network traffic between microservices.

Kubernetes Node/Pod Delete API Does not Account for Transient Errors

Nodes can experience temporary disconnects when network packets are dropped due to transient errors. These errors mean that for a small period of time, a node can be unavailable and hence the services running on that node cannot be reached. With the current set of Kubernetes APIs, there are two ways to deal with this situation.

Default option: Allow Kubernetes to keep trying to send traffic to that node and the services running on that node. This approach means that clients see timeouts or delays in responses from services running on the node.

Invoke the Delete API that will clean up the state on the node and reschedule services onto a different node. The disadvantage with this approach is that services will have to clean up their state, come up and re-initialize on a different node. The time required is high, making services unavailable for extended periods.

The private enterprise network edge acts as the heart of a private enterprise network private mobile network, providing both 4G LTE and 5G mobile services across the entire array of devices and applications connected via private cellular. It interconnects the private enterprise network AP (access points) across the private local, and wide area networks, for control and user data plane processing.

In some embodiments in which the private enterprise network edge is based on Kubernetes microservices, edge functionality can run on any compute platform, including Bare Metal, VMware, AWS Snow family, and Microsoft Azure private MEC. Acting as a mobile core, the private enterprise network edge is adaptable, with horizontal scalability and high availability enabled by design. The private enterprise network edge of the presently disclosed method and apparatus supports the clustering of multiple edge nodes to form a highly available and redundant edge cluster.

An HA cluster used for the private enterprise network edge nodes of some embodiments comprises a multi-node, failover capable Kubernetes edge cluster and VRRP (Virtual Router Redundancy Protocol) in front of the Kubernetes edge cluster to provide a load balancing.

FIG. 1 is an illustration of the architecture of an HA cluster. In particular, the example shown is an HA cluster formed as a three-node edge cluster 100, in accordance with some embodiments of the presently disclosed method and apparatus. The three-node edge cluster 100 comprises a first edge node, serving as an active leader 102a and two additional edge nodes, each serving as standby leaders 102b, 102c. It should be understood that an HA cluster in accordance with the presently disclosed method and apparatus may comprise any number of nodes. The three node example provided here is merely illustrative of the general concepts.

In some embodiments, a VRRP 106 is used to present a single consistent IP (Internet Protocol) address for connecting to private enterprise network CBSDs. This minimizes the downtime that might occur when an edge node fails. Each of the edge nodes 102, 104a, 104b is running both a Kubernetes leader node 108 and worker node 110. Only one node 108a can be the leader. Each other node 108b, 108c automatically enters standby leader mode. It should be noted that when elements that are referenced with a reference indicator that has both numeric and alphabetic characters in which the numeric characters are the same, the elements are essentially identical in structure and function. For example, the two standby leaders 112a, 112b are essentially two independent instances having the same structure and function. In such cases, all such similar elements may be referred to using only the numeric portion of the reference indicator. Therefore, leaders 108 refers to all of the leaders 108a, 108b, 108c. While the leader 108a is shown as the active leader, and the leaders 108b, 108c are shown as standby leaders, in some embodiments, each leader 108 has a similar structure and function. Therefore, any of the three may be activated.

All three edge nodes 102 of the cluster 100 have active worker nodes 110. These active worker nodes 110 concurrently performing: (1) application categorization; (2) traffic prioritization; (3) traffic forwarding; and (4) endpoint connectivity. When devices connect to the private enterprise network, their connectivity and traffic are actively load balanced across all three edge nodes in the cluster. Such load balancing is provided by a load balancer layer 107 that may be hosted with the VRRP 106. Alternatively, the load balancer layer 107 may be hosted in an independent processor within the cluster 100 or in a host that is shared with other functionality, including residing within the active leader 108a or another component of one or more of the edge nodes 102. It will be clear to those skilled in the art that the functionality performed by the load balancer layer 107 is such that it may be performed from any host that is capable of communicating with the edge nodes 102 and from which the load balancer layer 107 can direct the flow of communications between the APs 109 connected to the cluster 100 and the appropriate edge nodes 102. If the active leader fails, the standby leader nodes will elect a new leader and this becomes the main recipient of VRRP forwarded traffic.

Figure 2:
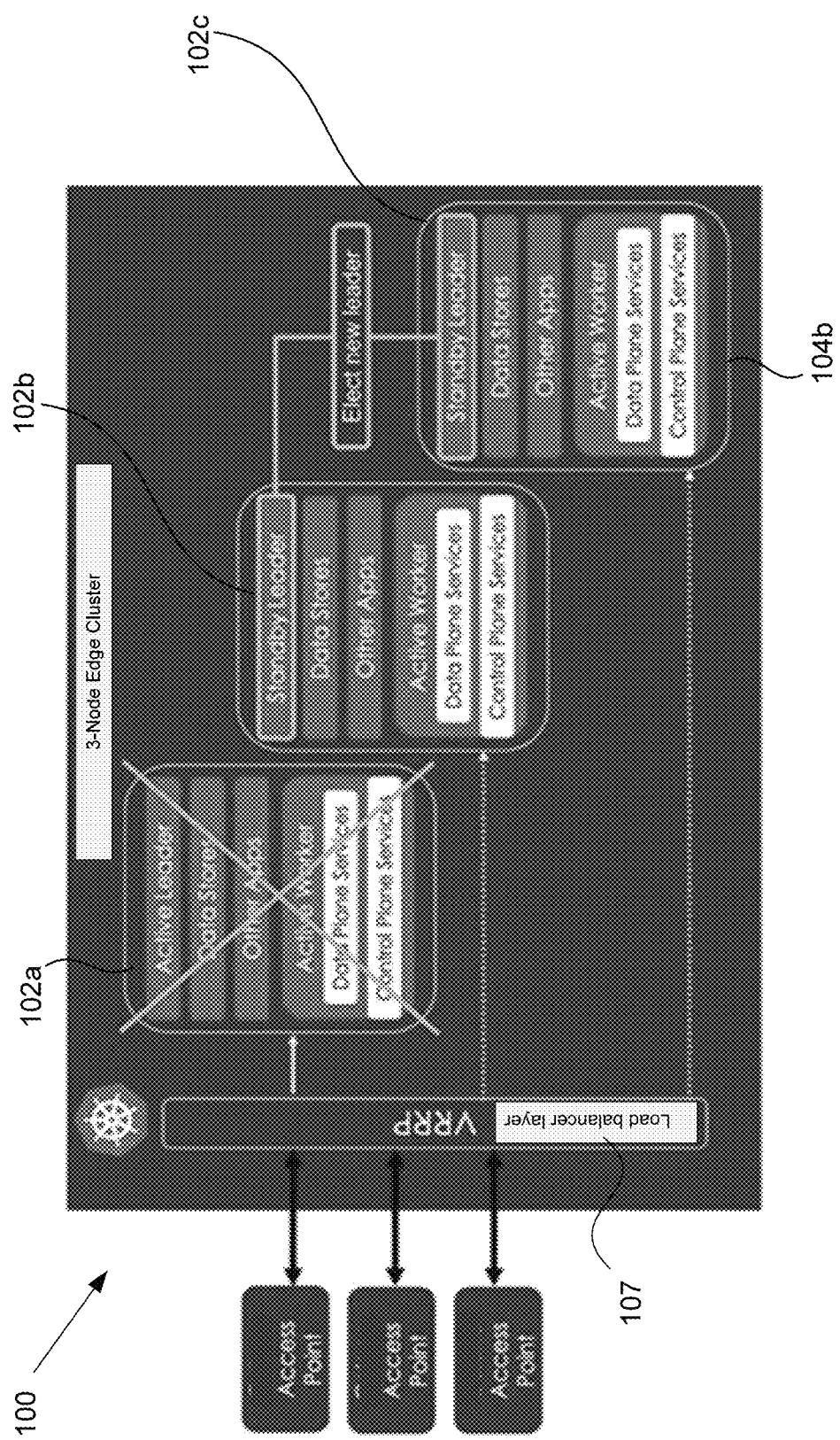
FIG. 2 illustrates the configuration of the three-node edge cluster when a failure occurs in the leader.

FIG. 2 illustrates the configuration 100 when a failure occurs in the leader 102a. In accordance with the presently disclosed method and apparatus, from the perspective of the private enterprise network AP, the leader is always present at the same VRRP IP address. Accordingly, active data connections for devices connected to the failed node failover (i.e., switch functional connections) to whichever of the two standby edge nodes 102b, 102c are designated to take the roll of active node in the edge cluster 100. In some embodiments, this takes approximately two minutes and depends on the number of devices connected to the active leader.

Once the failed services on the previously active leader 108a are repaired, the repaired node 102a rejoins the cluster as having a standby leader 108a and active worker node 110a. The newly elected active leader 108b will continue in the role of active leader.

Worker nodes are always active on every edge node within the cluster. If a Worker node fails, new connections and traffic will be routed to one of the remaining active worker nodes. In addition, devices connected to the failed worker node switch to an active worker nodes in the cluster 100. In some embodiments, recovery takes approximately 15 to 20 seconds. Once the failed worker node is repaired it will rejoin the edge cluster 100 as a follower and resume handling device connectivity.

VRRP+"Keepalived" are used with Kubernetes to create multi master cluster and provide master redundancy. In some embodiments, VRRP+keepalived are used by creating a new VRRP router for each node, tracking each worker node in the cluster and providing high resiliency for services running on those nodes. In addition, Kubernetes expects services and clients of those services to have retries built in so that worker node failures are handled by retrying for a while and then deleting the nodes. In some embodiments, track worker nodes are closely tracked using a unique VRRP router for each node and node failures are immediately acted upon, rather than waiting for Kubernetes to detect failures and take action.

In some embodiments, a layer on top of Kubernetes is introduced to handle transient failures. Since Kubernetes APIs only allow for a full cleanup and deletion of nodes and services when a fail occurs, a layer is provided to temporarily take services and nodes out of action in case of transient failures. This is done by tracking the state of all services and their endpoints, and in case of transient failures, removing only the failed endpoint of a service from the service state. In some embodiments, a publish subscribe layer is added that allows clients to subscribe for updates to service endpoints. Accordingly, clients of the services see all of the service endpoints. When a transient error occurs, the service state is updated to have one less endpoint by removing the faulty endpoint. This update is automatically propagated to all the subscribed clients. They react to the update by sending APIs to only the remaining valid endpoints.

In addition, in some embodiments, the load balancer layer is selectively bypassed for critical services during node add/delete events. When a master node is added or deleted from a Kubernetes cluster, Kubernetes needs to sync its state to the new master to make it part of the cluster. During this time, Kubernetes API server and load balancer layers can be momentarily unavailable and cause disruption to existing/already running services. This can cause private enterprise core network services to become unavailable or respond with errors for very short periods of time. To avoid this, a layer is implemented that identifies service endpoints directly behind the Kubernetes load balancer layer and makes them reachable by making the IP and port of the endpoints available to client directly. In some embodiments, clients diligently pick the right endpoint to talk to and then send traffic to those endpoints, thus bypassing the load balancer layer. This allows the private enterprise network stack to hide the transient failures caused by Kubernetes API server and load balancer layer being temporarily available.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A private network comprising:
   a) a high availability (HA) cluster having a plurality of nodes, the plurality of nodes including at least one worker node and a leader node;
   b) an architecture that uses microservices and containerized applications and provides a service that runs on the cluster of nodes, wherein functions or services are provided by the HA cluster of nodes, wherein the functions or services are serviced by the containerized applications as microservices that are deployable on a containerized-application-automation-system that automates-deployment, scaling and management of containerized applications; and
   c) a VRRP (Virtual Router Redundancy Protocol) router for each node, the VRRP router tracking each worker node in the cluster and providing high resiliency for services running on those nodes and further providing load balancing to ensure that a load shared by the plurality of nodes is balanced between the nodes;
   wherein worker nodes are closely tracked using the VRRP router for each node; and
   wherein failure of the leader node is immediately acted upon by reassigning an Internet Protocol (IP) address of the failed leader node to one of the plurality of nodes of the cluster that is still functioning.

2. The private network of claim 1, wherein in case of a node failure event, the containerized-application-automation-system continues to route traffic to unresponsive endpoints until an API (Application Interface) is invoked to remove the stale endpoint; and the private network limits consideration to active/valid endpoints for routing traffic.

3. The private network of claim 1, the at least one worker node includes multiple active worker nodes that concurrently perform:
   (1) application categorization;
   (2) traffic prioritization;
   (3) traffic forwarding; and
   (4) endpoint connectivity.

4. The private network of claim 1, the VRRP being part of a load balancer layer hosted in an independent processor within the cluster.

5. The private network of claim 1, the VRRP being part of a load balancer layer hosted in a host that is shared with other functionality, residing within the leader.

6. The private network of claim 1, wherein stateful services that are part of a private enterprise network stack associated with the private network are removed from the cluster of nodes so that stale endpoints are no longer accessed, even though the containerized-application-automation-system does not automatically remove stateful applications having unresponsive processes from the cluster of nodes.

7. The private network of claim 1, wherein failure of a node is immediately acted upon without waiting for the containerized-application-automation-system to detect the failure.

* * * * *